(12) United States Patent
Savant et al.

(10) Patent No.: US 6,303,276 B1
(45) Date of Patent: Oct. 16, 2001

(54) METHOD AND APPARATUS FOR MAKING OPTICAL MASTER SURFACE DIFFUSERS SUITABLE FOR PRODUCING LARGE FORMAT OPTICAL COMPONENTS

(75) Inventors: Gajendra D. Savant; Stephen A. Kupiec; Joanna L. Jannson, all of Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/137,397

(22) Filed: Aug. 20, 1998

Related U.S. Application Data (63) Continuation of application No. 09/075,023, filed on May 8, 1998, now abandoned.

(51) Int. Cl.[7] ................................................. G03H 1/32
(52) U.S. Cl. .................... 430/321; 430/320; 430/945; 359/599; 359/15; 355/85; 355/104; 264/1.31; 264/1.37
(58) Field of Search ...................... 430/320, 321, 430/945; 355/85, 104; 359/15, 599; 204/1.33, 1.31, 1.34, 1.36, 1.37, 1.6

(56) References Cited

U.S. PATENT DOCUMENTS

| | | | |
|---|---|---|---|
| 3,946,215 | * | 3/1976 | May ..................................... 235/152 |
| 3,995,948 | * | 12/1976 | Abe et al. ............................. 427/165 |
| 4,294,782 | * | 10/1981 | Froelig .................................. 264/1.6 |
| 4,336,978 | * | 6/1982 | Suzuki et al. ........................ 359/599 |
| 4,567,123 | * | 1/1986 | Ohtaka et al. ....................... 430/321 |
| 4,589,972 | * | 5/1986 | Pompea et al. ......................... 204/29 |
| 5,046,793 | * | 9/1991 | Hockley et al. ..................... 359/599 |
| 5,365,354 | * | 11/1994 | Jannson et al. ..................... 359/599 |
| 5,493,327 | * | 2/1996 | McCallum et al. .................. 347/262 |
| 5,521,030 | * | 5/1996 | McGrew .............................. 430/320 |
| 5,534,386 | * | 7/1996 | Peterson et al. ..................... 430/320 |
| 5,652,804 | * | 7/1997 | Bromstein et al. .................. 382/141 |
| 5,759,455 | * | 6/1998 | Kamitakahara et al. ........... 264/1.34 |

FOREIGN PATENT DOCUMENTS

783477 * 9/1957 (GB) .................................... 355/85

OTHER PUBLICATIONS

Thompson et al., "introduction to Microlithography", ACS Symposium Series 2, pp. 16–59 and 320–321, 1983.*

O. Svelto et al., "Principles of Lasers", 3rd ed., Plemun Press, pp. 304–309 and 400–405, 1989.*

Ralston et al., "Encyclopedia of Computer Sceince and Engineering, Second Edition", pp. 313–317, 1260–1264, 1277, 1278 & 1320–1322, Oct. 1983.*

* cited by examiner

Primary Examiner—Martin Angebranndt
(74) Attorney, Agent, or Firm—Nilles & Nilles, S.C.

(57) ABSTRACT

An improved method for generating masters having a plurality of randomly distributed speckle suitable for making seamless light shaping diffusers of virtually any size and at low cost is disclosed herein. The method utilizes incoherent light to record a desired speckle pattern in a photosensitive medium which is then exposed in an imagesetter.

24 Claims, 7 Drawing Sheets

PHOTO REDUCTION LENSES SYSTEM

METHOD AND APPARATUS FOR MAKING OPTICAL MASTER SURFACE DIFFUSERS SUITABLE FOR PRODUCING LARGE FORMAT OPTICAL COMPONENTS

CROSS-REFERENCE TO RELATED APPLICATIONS

The present application is a continuation of commonly assigned U.S. patent application Ser. No. 09/075,023, filed May 8, 1998, and entitled "Method and Apparatus for Making Optical Masters Using Incoherent Light" now abandoned.

BACKGROUND OF THE INVENTION

1. Field of the Invention

This invention pertains to an improved, faster and more reliable method for generating random pattern apertures in a master suitable for manufacturing light shaping diffusers and similar optical components.

2. Discussion of the Related Art

Figure 1:
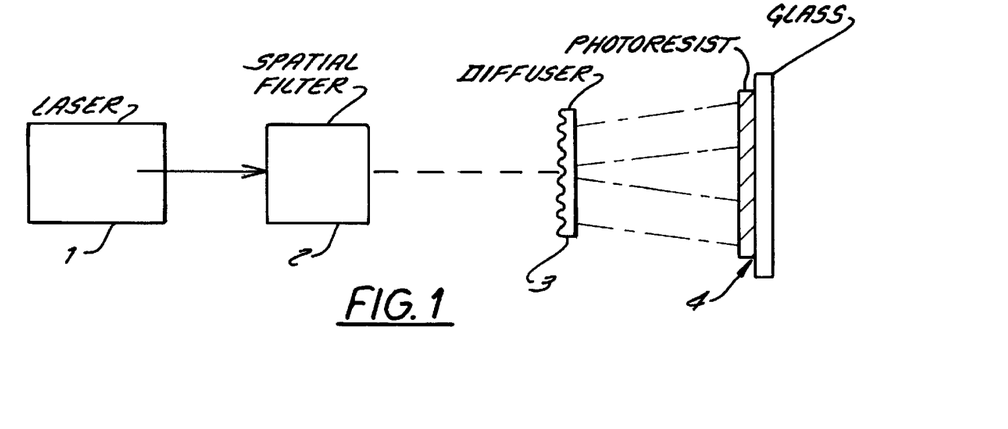
FIG. 1 illustrates a prior art method of recording a photosensitive medium with speckle.

In the past, coherent lasers have been used to manufacture optical products such as light shaping diffusers. As shown in FIG. 1, a photosensitive medium 4, such as photoresist, is recorded by exposing it to coherent (laser) light 1 from a krypton laser passed through a spatial filter 2 and a diffuser 3. The diffuser 3 may be a ground glass, holographic, lenticular or acetate diffuser, or a diffuser itself previously recorded in the recording set-up of FIG. 1.

Preferred methods and apparatuses for making such diffusers are disclosed in U.S. Pat. No. 5,365,354 entitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee, relate to methods for recording optical products such as diffusers and replicating those diffusers so that they may be mass produced. Each of these U.S. patents is incorporated by reference herein for purposes including, but not limited to, indicating the background of the present invention and illustrating the state of the art. Related U.S. patent applications include Ser. No. 08/595,307 entitled "LCD With Light Source Destructuring and Shaping Device," Ser. No. 08/601,133 entitled "Liquid Crystal Display System with Collimated Backlighting and Non-Lambertian Diffusing," Ser. No. 08/618,539 entitled "Method of Making Liquid Crystal Display System," Ser. No. 08/800,872 entitled "Method of Making Replicas and Compositions for Use Therewith," and Ser. No. 09/052,586 entitled "Method of Making Replicas While Preserving Master." All the above applications are owned by the present assignee and are hereby incorporated by reference for purposes including, but not limited to, indicating the background of the present invention and illustrating the state of the art.

The methods taught in these patents produce both internal and surface structures in the photosensitive medium 4 called "speckle" which diffuse light in a highly efficient, uniform, and controlled manner not possible with prior methods. As fully described in the above patents, the size and shape of the speckle recorded in the photosensitive medium can be controlled, thereby controlling the angular output of light from the diffuser after it is developed. Diffusers made by the methods taught in the above patents are extremely useful as viewing screens and homogenizers, both of which can be used in myriad applications.

For mass production, the surface structures which remain in the photosensitive medium 4 after processing are exploited. After the photosensitive medium has been exposed for a suitable length of time, it is processed to make a master. A first generation submaster or replica made of epoxy or other plastic resin may then be made from the master by applying epoxy to the surface of the master, uniformly spreading the epoxy out on the master, and then separating the epoxy from the master after the epoxy has been cured. Successive generations of submasters are typically made from the previous generation submaster using the above process. Each successive generation submaster exhibits a change (usually a reduction) in the aspect ratio of the surface structure features due to shrinkage.

Figure 2A:
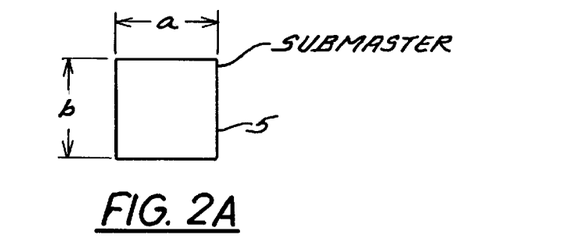
FIG. 2 illustrates a prior art method for making large masters from a number of submasters.
Figure 2B:
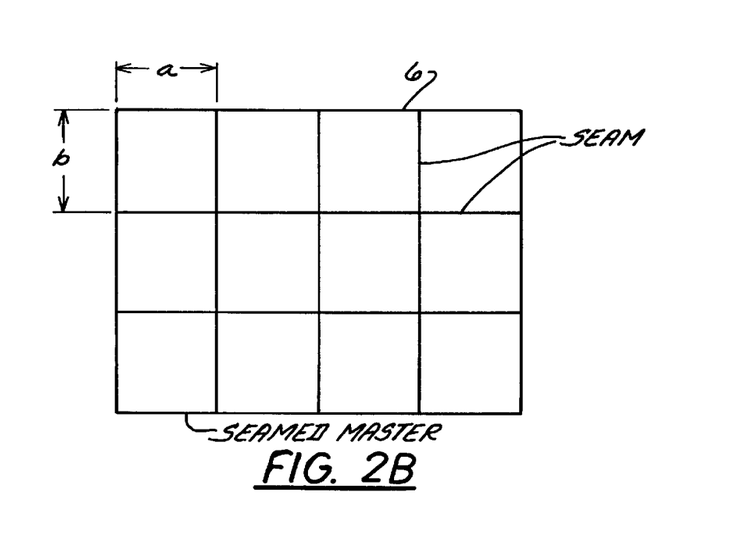

The prior art processes outlined above have a number of practical shortcomings. First, the overall size of diffusers capable of being produced is limited by the intensity of the lasers available and the sensitivity of the photosensitive media. For example, prior art systems typically require a coherent light source capable of providing very high energy density on the order of 2.7 joules/cm$^2$ to generate a suitable exposure. As a result, in the past, large masters have been assembled from a number of smaller submasters placed next to one another in an attempt to make a larger, seamless master as shown in FIG. 2. With this approach however, it has been difficult to avoid discontinuities and seams from appearing along the edges where the submasters are joined.

Another problem encountered in making large master diffusers has been the appearance of an offset of the apertures in the corners relative to those in the central region, resulting in undesirable non-uniform patterns. Finally, because of the relatively slow reaction of photoresist to light, and the physical separation during recording required among the light source, the diffuser and the photosensitive media as seen in FIG. 1, prior art systems are known to be extremely sensitive to vibration and movement. Even the slightest vibration may create phase changes in the coherent light source and thus cause undesirable aberrations in the master. The size of these aberrations can exceed the size of the speckle, rendering the master useless. Vibration and other shortcomings of the above recording methods make it difficult if not impossible to record speckle of extremely small size. In order, for instance, to make a diffuser having an extremely wide output in the horizontal direction, and an extremely narrow output in the vertical direction, the speckle recorded in the photosensitive medium must be very small in the horizontal direction (and large in the vertical direction). (Light output orientation from the diffuser is inversely proportional to speckle size and orientation within the diffuser.) For example, in order to triple the horizontal output angle, speckle size must be decreased to one third.

Furthermore, in the prior art, a separate master had to be made for each diffuser having a particular angular output, thus necessitating a large library of masters having different angular outputs. For instance, a different master is required to achieve a 10°×10° circular output, 10°×15° elliptical output and so on. In order to create each of these masters, the recording set-up of FIG. 1 had to be employed. As discussed above, this recording process is slow and susceptible to vibration and other performance degrading factors.

A method of making large, seamless masters that is not susceptible to vibration and is faster and less expensive would be of great benefit.

SUMMARY AND OBJECTS OF THE INVENTION

A primary object of the present invention is to provide an improved method for generating masters having a plurality of randomly distributed speckle suitable for making light shaping diffusers. Another object of the invention is to provide a simple and reliable method for generating large, seamless masters. Another object of the invention is to provide a method for generating masters that is not sensitive to vibration and movement and which yields perfectly uniform and repeatable large scale light shaping diffusers at low cost. Another object of the invention is to provide a method for generating masters in which the angular spread of light output from a light shaping diffuser may be controlled without requiring the use of numerous successive generations of submasters to arrive at a desired angular spread.

In accordance with the present invention, these objects are achieved by providing methods in which incoherent light is used to record the desired speckle pattern in the photosensitive medium. In accordance with one aspect of the invention, a film is exposed to either an actual speckle pattern or one generated by computer. The film may be exposed in several ways including in a standard coherent laser set up as in FIG. 1 where the film replaces the photosensitive medium 4 or by a computer driven imagesetter driven by a random sequence of numbers which exposes the film randomly with dots. After exposure, the film is then developed, placed in contact with a photosensitive medium such as standard photoresist, and exposed to incoherent light which exposes the photosensitive medium to the speckle pattern in the film. The speckle structure in the photosensitive medium is then used as a master to create subsequent submasters and ultimately the final diffuser product.

In accordance with another aspect of the invention, the film is exposed in an imagesetter according to a pseudorandom sequence obtained from a maximum length shift register, which may be implemented in hardware or software. The pseudorandom sequence is used by the raster image processor of an imagesetter to control the random distribution of laser or radiation generated features or "dots" on the film. The dots so exposed on the film may be made to resemble the speckle recorded in a standard set-up as in FIG. 1.

In accordance with another aspect of the invention, a highly sensitive millimask film may be exposed in a standard coherent laser set-up where the millimask film replaces the usual photosensitive medium. In this way, speckle are recorded in the film in a shorter time, with less susceptibility to vibration, and with greater resolution.

Where especially small feature sizes in the film are desirable, such as where a diffuser having a large angular output is desired, the film from either of the above methods may be reduced (or enlarged) using standard photo reduction techniques. The reduced or enlarged film may then be contact copied onto a photosensitive medium such as photoresist or the like or used in a stepper to create yet a second film having dots of even smaller size, which in turn may be contact copied with incoherent light onto photoresist or the like or used in the stepper to expose photoresist in the stepper.

In accordance with yet another aspect of the invention, film may be avoided altogether by coating the drum in a modified imagesetter with a photosensitive medium such as photoresist and exposing it with the imagesetter laser. Standard etching techniques are then used to etch away the unexposed photoresist on the drum and then etch the drum itself with the random dot pattern. The drum is then used to emboss or stamp an epoxy or other layer on a plastic or other sheet in preferably a continuous process.

In accordance with yet another aspect of the invention, collimated UV, excimer or electron beam sources may be used to expose a sandwich of photoresist on chrome on glass in accordance with a pseudorandom dot pattern. The unexposed photoresist is etched away and then the chrome is etched away to create the dot pattern in the chrome.

Diffusers manufactured by the method of the present invention can be made large enough to be used in front and back projection screens, fluorescent light screens, highway and advertising signs, and the like. Additional benefits of the present invention include inexpensive and rapid turnaround (approximately 48 hours from the initial concept to making of a master); use of inexpensive incoherent light sources such as a standard arc lamp to expose the photoresist material; insensitivity to vibration and movement; obtaining a perfectly uniform and repeatable large scale diffuser; obtaining large elliptical and circular diffusers thereby permitting angular outputs of any number of shapes; the ability to create unique diffuser patterns such as patterns exhibiting a linear or circular gradient, or variable direction elliptical features. Other benefits and advantages of the methods of the present invention will be readily apparent to those of ordinary skill in the art.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear understanding of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which.

DESCRIPTION OF THE PREFERRED EMBODIMENTS

A. Recording Film in an Imagesetter

One preferred embodiment of the present invention utilizes an imagesetter to generate a high resolution mask for making a master. Imagesetters are well known in the photolithography arts for their ability to generate high resolution masks on photographic film and are typically used for high resolution color printing. Imagesetters suitable for use in the present invention include those produced by Agfa and Hellinetronic.

An imagesetter typically includes a supply of unexposed film, a recording support surface or holder, e.g., a drum, for supporting the material during exposure, and an image exposing system for forming the image to be recorded based on instructions from a dedicated raster image processor or "RIP." The image exposing system employs one or more lasers or other radiation beam sources. The film, typically a Kodak 2000 series film, or the like, is scanned and exposed by the beam and a latent image is formed on the material. The film is then removed from the imagesetter for subsequent processing.

Figure 3:
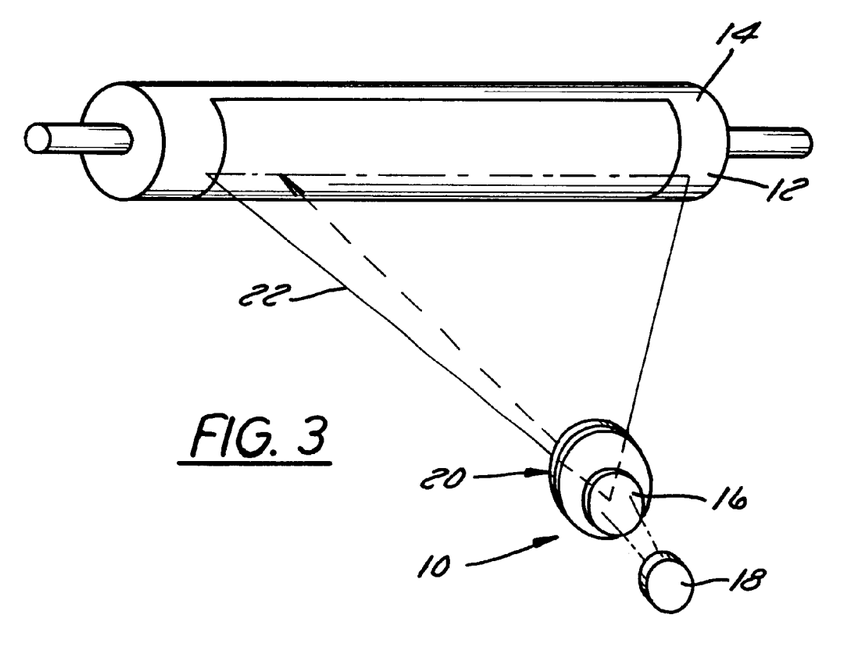
FIG. 3 illustrates a side view of an imagesetter suitable for carrying out the methods according to the present invention.

FIG. 3 depicts an imagesetter 10. Film 12 is held by support surface 14 which may be a capstan roller as shown in FIG. 3, a flat plate, a cylindrical drum platen, or other support surface. A scanning exposure system 16 for exposure of the film comprises a light or radiation source 18 such as a laser mounted a fixed distance away from support surface 14, an optical system 20 for focusing a beam 22 emitted from light source 18 and a beam deflecting apparatus for scanning the beam across the material 12. The scanning exposure system is moved along line C—C of the drum 14 by a precision linear drive mechanism while the film 12 is held in place. As the scanning exposure system moves, the lasers or other light or radiation source are illuminated to expose areas of the film, according to instructions provided by the RIP.

In the present invention, the basic feature to be recorded on the film is referred to as a "dot," although features are not necessarily circular and may be elliptical, rectangular or other shape. Larger features, such as elliptical structures, can be reproduced by combining multiple adjacent dots. Dots correspond to the "speckle" of the prior art and may be combined as necessary to achieve a diffuser having the desired angular output. Whether or not a dot appears at a particular location on the master is determined by a pseudorandom sequence described below.

i. Generating a Suitable Pattern For Diffusing Light

Figure 4A:
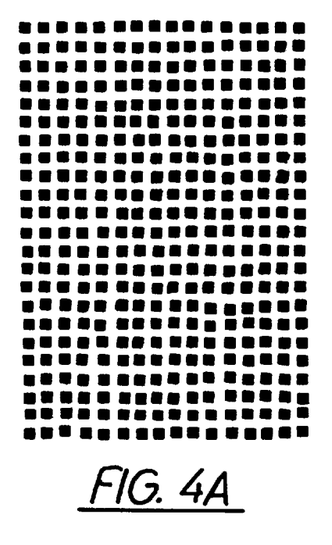
FIG. 4A illustrates a regular, periodic grating of rectangular apertures.
Figure 4B:
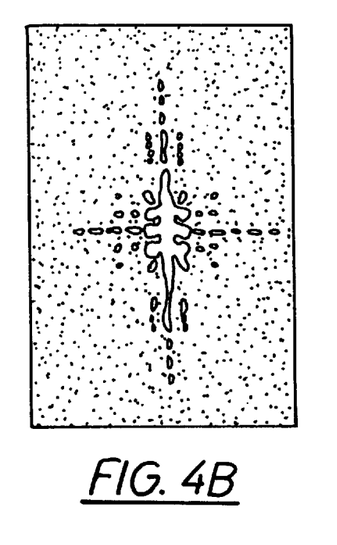
FIG. 4B illustrates the diffraction pattern that results from illuminating this grating with white light.
Figure 5A:
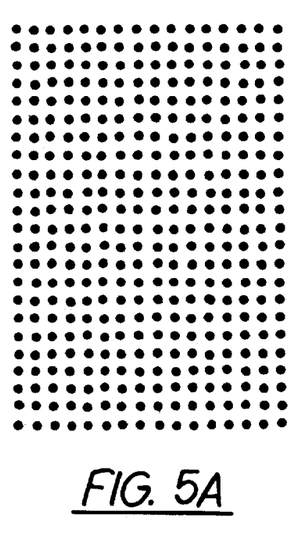
FIG. 5A illustrates a regular, periodic grating of circular apertures.
Figure 5B:
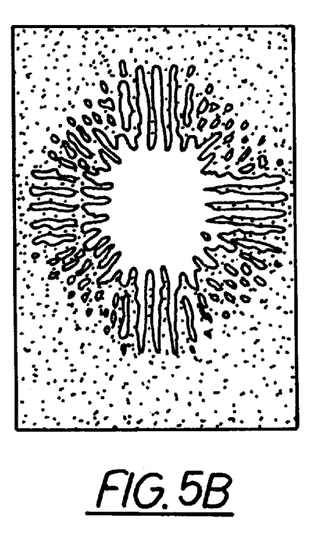
FIG. 5B illustrates the diffraction pattern resulting from illuminating the diffraction pattern of FIG. 5A with white light.

FIG. 4A, shows a regular, periodic grating of rectangular apertures. FIG. 4B shows the diffraction pattern that results from illuminating this grating with white light. FIG. 5A shows a regular, periodic grating of circular apertures. FIG. 5B shows the resulting diffraction pattern. Because of the regular periodicity of these grating patterns, each emergent light wave bears a fixed phase relationship to the others. Thus, as can be seen, there are certain directions in which the light waves constructively and destructively interfere, resulting in a diffraction pattern. A goal in making a diffuser is to avoid such diffraction patterns so that the light output is uniformly diffuse.

Figure 6A:
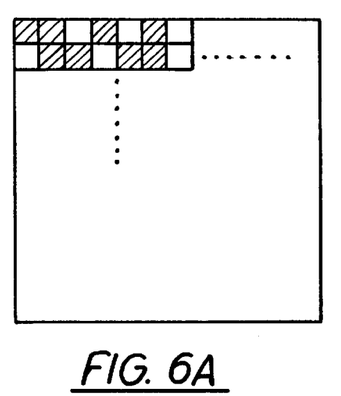
FIG. 6A illustrates a random array of rectangular apertures.
Figure 6B:
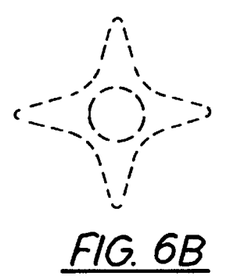
FIG. 6B illustrates the resulting white light diffraction pattern.
Figure 7A:
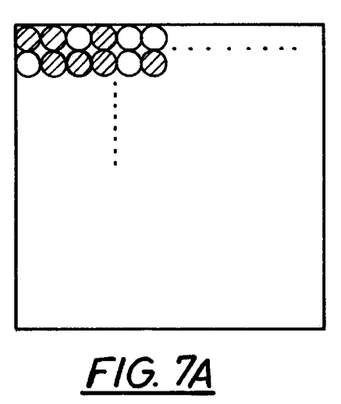
FIG. 7A illustrates a random array of circular apertures.
Figure 7B:
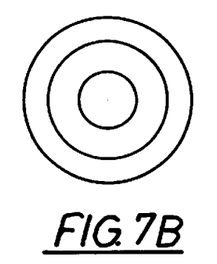
FIG. 7B illustrates the resulting white light diffraction pattern, a series of concentric rings surrounding a white central disk.

FIG. 6A shows a random array of rectangular apertures. FIG. 6B shows the resulting white light diffraction pattern. FIG. 7A shows a random array of circular apertures. FIG. 7B shows the resulting white light diffraction pattern, a series of concentric rings surrounding a white central disk. As the figures demonstrate, a random array of apertures results in a diffraction pattern that is much more diffuse that the pattern output from the periodic arrays. There is still, however, a diffraction pattern. The pattern results from the use of a white light source that is somewhat coherent. If a completely incoherent light source is used the diffraction pattern will be uniformly diffuse. Alternatively, blurring of the apertures to remove sharp edges will also eliminate the pattern. Thus, in general, the mask required for making a diffuser preferably will have random and disordered features that have no sharp edges.

Figure 8:
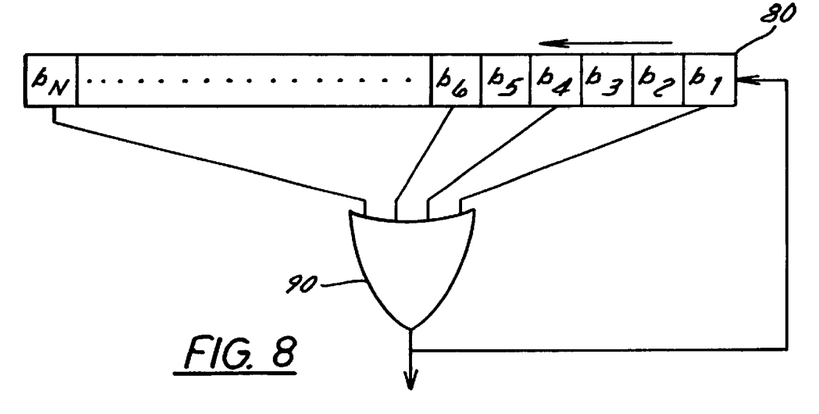
FIG. 8 illustrates a functional diagram of an apparatus suitable for generating the pseudorandom sequence according to the present invention.

Such a pattern may be obtained from an imagesetter by generating a mask code based on a pseudorandom sequence of sufficient length such that it does not repeat itself over an area equal to the size of the mask. The pseudorandom sequence is generated by a maximum length shift register which may be implemented in software or hardware. A functional diagram of a hardware implementation is shown in FIG. 8 which includes shift register 80 and OR gate 90 connected in a feedback configuration. Preferably, the maximum length shift register is implemented in software so that stock imagesetter RIPs may be utilized rather than custom built hardware. A hardware implementation is preferable where speed is most important since hardware can be optimized for a particular application and is therefore generally faster. An example of source code that is suitable for generating a pseudorandom sequence in the C language appears below.

```
#define mask 0x80000057
static unsigned long ShiftRegister = 1;
void seed_LFSR (unsigned long seed)
{
    if (seed == 0) / * avoid calamity */
        seed = 1;
    ShiftRegister = seed;
}
int modified_LFSR (void)
{
    if (ShiftRegister & 0x00000001) {
        ShiftRegister = (ShiftRegister ^ mask) >>1) |
    0x8000000;
        return 1;
```

```
        } else {
            ShiftRegister >>= 1;
            return 0;
        }
    }
``` ii. Generating Features that Shape the Light

In general, feature size and shape determine the angular output pattern of light from a light shaping diffuser. The angular distribution of light is governed by the Fresnel diffraction equations. For a circular aperture of a given radius, r, and light of wavelength λ, the corresponding angular spread θ is as follows:

$$\sin \theta = 1.22 \lambda / 2r$$

Elliptical features having aligned axes are frequently used to shape the output pattern of a light shaping diffuser. Elliptical features having major axes horizontally aligned will produce an output pattern that is oblong in the vertical direction, i.e., rotated by 90° with respect to the major axis of the elliptical diffuser features. A complete disclosure of how to record speckle to generate a desired angular distribution of light from a light shaping diffuser is contained in the U.S. patents identified in the Discussion of the Related Art, and are incorporated herein by reference.

iii. Determining the Number of Features

After the aperture size and shape have been calculated, it is necessary to determine how these features will be constructed from a cluster of dots. Each basic feature may be represented by one binary bit.

Basic feature size is determined by several factors. First, the programming language that describes the printing process determines the precision with which printing instructions can be expressed. The PostScript language is used in the preferred embodiment. Since one PostScript point=1/72nd of an inch, an inch is 25,400 microns, a PostScript point is 352.78 microns. Calculations can be carried out to 0.0001 of a PostScript point, or 0.035 microns. This level of precision is sufficient for any optical applications of the present invention. Other printing programming languages may be employed provided they are capable of expressing features with sufficient precision, as would be apparent to one of skill in the art. In addition, as with any optical system, feature size is also limited by diffraction and lens aberrations, as will be appreciated by those of ordinary skill in the art.

In order to avoid a periodic structure from appearing in spaces between features, it is necessary that there be some feature overlap. A uniform overlap of 0.75 of the spacing between features (roughly on the order of √2) is sufficient to ensure that there is enough overlap to avoid uniform areas that never contain features.

The number of features for a master of a given area is determined as follows:

$$\text{Feature density} \times \text{Area of film} = \text{Number of features}$$

A pseudorandom sequence of sufficient length so that features are randomly distributed may be determined by the following equation:

$$\frac{\ln (\text{number of features})}{\ln 2} = \text{Bits}$$

where Bits is the number of bits in the maximum length shift register needed to generate the random sequence of sufficient size to cover the entire area of film to be exposed without repeating. A register of 128 bits in length is generally sufficient for any practical application.

iv. Generating the Master

After the film has been exposed in the manner described above, the film can be developed by any standard developing technique to arrive at a negative.

Figure 9:
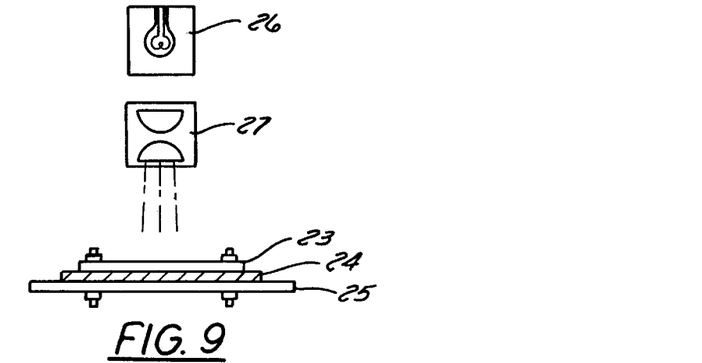
FIG. 9 illustrates contact copying of a film on photoresist.

As seen in FIG. 9, the negative serves as the mask 23 in a standard contact copy process by placing it onto photoresist 24 or like photosensitive medium. The photoresist 24 is typically on a substrate such as a photolithographic plate 25 made of glass, although a suitable plastic material could also be used. The mask 23 is securely affixed to the photolithographic plate 25 by clamps, a cover sheet, or by a vacuum as generally shown in FIG. 9.

The mask/photoresist plate combination is then exposed to a source of incoherent light 26 which exposes the photoresist plate with the mask pattern as also shown in FIG. 9. Preferably, this light source is an uncollimated UV light source in the wavelength range of 365 to 400 nm with an output power of 300 to 500 watts. The source should be uniformly bright and diffuse, and be of the same size as the sheet of film to be exposed. A large fluorescent lamp is a good example of a diffuse light source of sufficient size. A smaller light source may be used if it is scanned uniformly over the surface to be exposed.

A diffuse light source will cause a blurring of boundaries between light and dark sections. It is desirable that these boundaries be blurred because features with very sharp edges will yield non-diffuse light with a diffraction pattern such as the bull's-eye or ringed pattern as shown in FIG. 7B. Alternatively, if a suitably diffuse light source is not available, there are several other ways to obtain feature blurring. One way is to make successive generation masters from the first generation master to eliminate the sharp edges of the features. Alternatively, the imagesetter can be adjusted to be slightly out of focus. Another possible way to blur feature edges is by linear chemical processing of the film and/or of the photoresist. Linear processing involves shifting the strength of the developer such that a linear variation between black and white is obtained.

B. Recording Film in a Standard Laser Recording Setup

Figure 10:
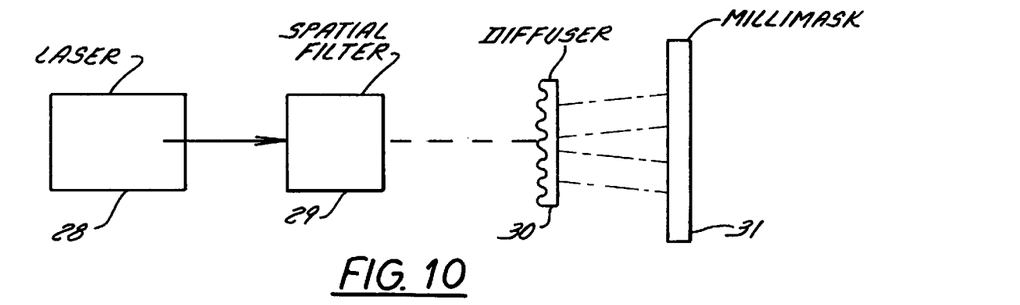
FIG. 10 illustrates a standard laser recording set-up using millimask film.

In a second embodiment using film, a master according to the present invention is made by using the recording setup of FIG. 10 but recording the speckle on a semiconductor flat film 31 such as 8E56 millimask, in place of the photoresist/glass plate of FIG. 1. The film may be exposed with coherent light, such as laser light from laser 28, and passed through a diffuser 30. Because the film 31 is so sensitive, only several seconds of exposure are required as opposed to many minutes in the case of photoresist. The resulting film may be utilized as a mask in a standard contact copy process as was seen in FIG. 9 to copy the features onto a photoresist plate by exposure to incoherent ultraviolet light in the manner described above. Since the millimask film is in physical contact with the photoresist by a vacuum or clamping means, the exposure time can be as long as necessary without concern for stability problems encountered in prior art methods. Consequently, extremely long exposure times may be used making it possible to record deep aspect ratio structures in the photoresist.

C. Photo Reduction of Film

Figure 11:
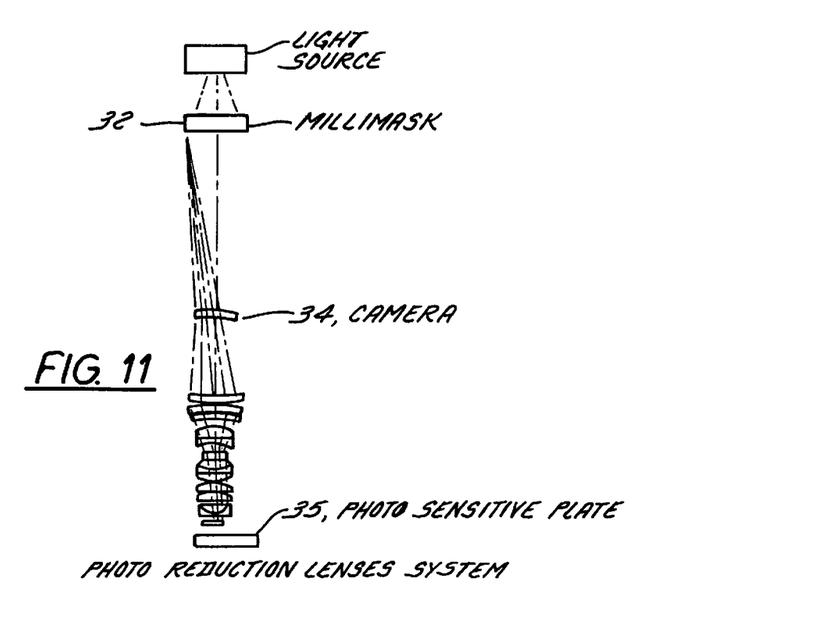
FIG. 11 illustrates a photoreduction of film.
Figure 12:
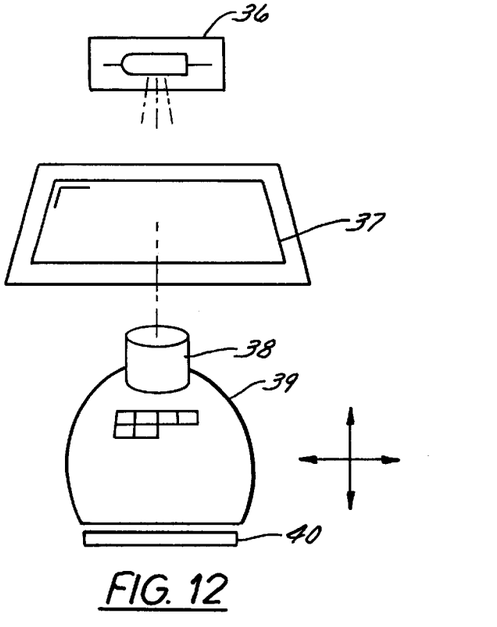
FIG. 12 illustrates a stepper mask.

Using the contact copying methods described above in sections A and B, there will always be a 1:1 correspondence in size between the film negative and the photoresist covered plate. Feature sizes of less than about 5 microns are difficult to achieve using simple contact copying techniques. For dots smaller than 4 microns, a photoreduction technique may be used as shown in FIG. 11. First, an exposed film 32 is created using the techniques above or other suitable techniques. The film is then developed and placed in a standard photoreduction camera 34 to reduce the size of the dots recorded on the film. The film may then be contact copied onto photoresist or the like as shown in FIG. 9. Additionally, the reduced film may then be used as a mask in a stepper as seen in FIG. 12 to expose a second film which is reduced (or enlarged) yet again. The second film may then be contact copied onto photoresist or the like. Alternatively, the stepper, with the first or second film as a mask, could be used to expose photoresist by stepping the film along discrete portions of the photoresist and exposing the photoresist at each step. As seen in FIG. 12, a stepper consists of an ultraviolet light source 36 with a shutter, a large mask 37, typically five times actual size, a 5× reduction lens 38 and a precision x-y movable stage 40. The photoresist 39 is placed on the stage and the stage is then moved and the shutter opened to expose selected areas of the photoresist to the UV light in "steps" through the mask 37.

Figure 13:
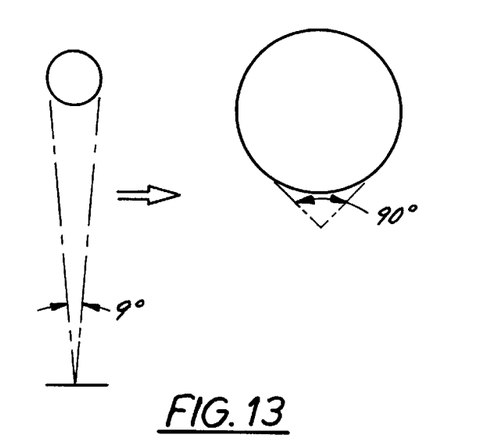
FIG. 13 illustrates 9°→90° angular spectrum output increase due to a 10× dot size reduction.

Since aperture size determines the angular spread of light output from a diffuser, photoreduction can also be used to change the angular spread of the diffuser without the necessity of recording a new master. The photoreduction of feature size will result in a proportionate increase in angular output or spread. For example, a photoreduction of feature size by 10× will result in a 10× angular increase. Thus, as seen in FIG. 13, if the unreduced film has a circular angular output of 9°, a 10× reduction will increase the angular output to 90°. In this way, the angular spread of a master may be adjusted by photoreduction or enlargement.

Figure 14:
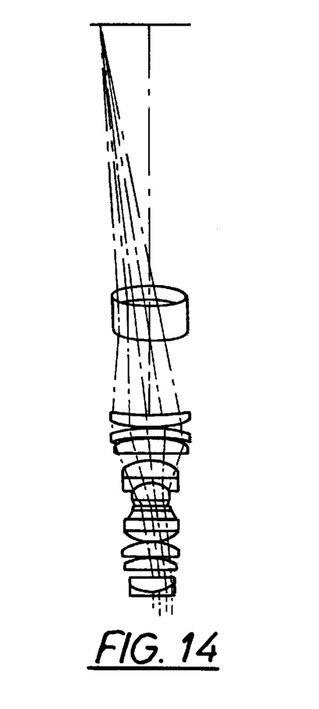
FIG. 14 illustrates a recording set-up to change the shape of an angular output using an anamorphic lens in a stepper.

As seen in FIG. 14, the shape of the features may also be changed by using an anamorphic lens in the stepper to distort the magnification in either the horizontal or vertical direction. With proper optical engineering, the feature size and shape can be obtained from a single mask thus greatly simplifying the process of making custom light shaping diffusers which previously required modifying the recording set up of FIG. 1 each time a master with different characteristics was required.

D. Film-less Metal Drum Etching

Figure 15:
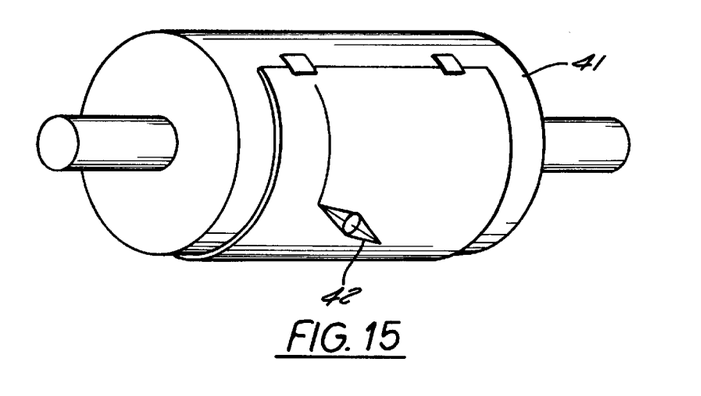
FIG. 15 is a drawing of a film-less recording set-up using photoresist on a metal drum.
Figures 16, 17:
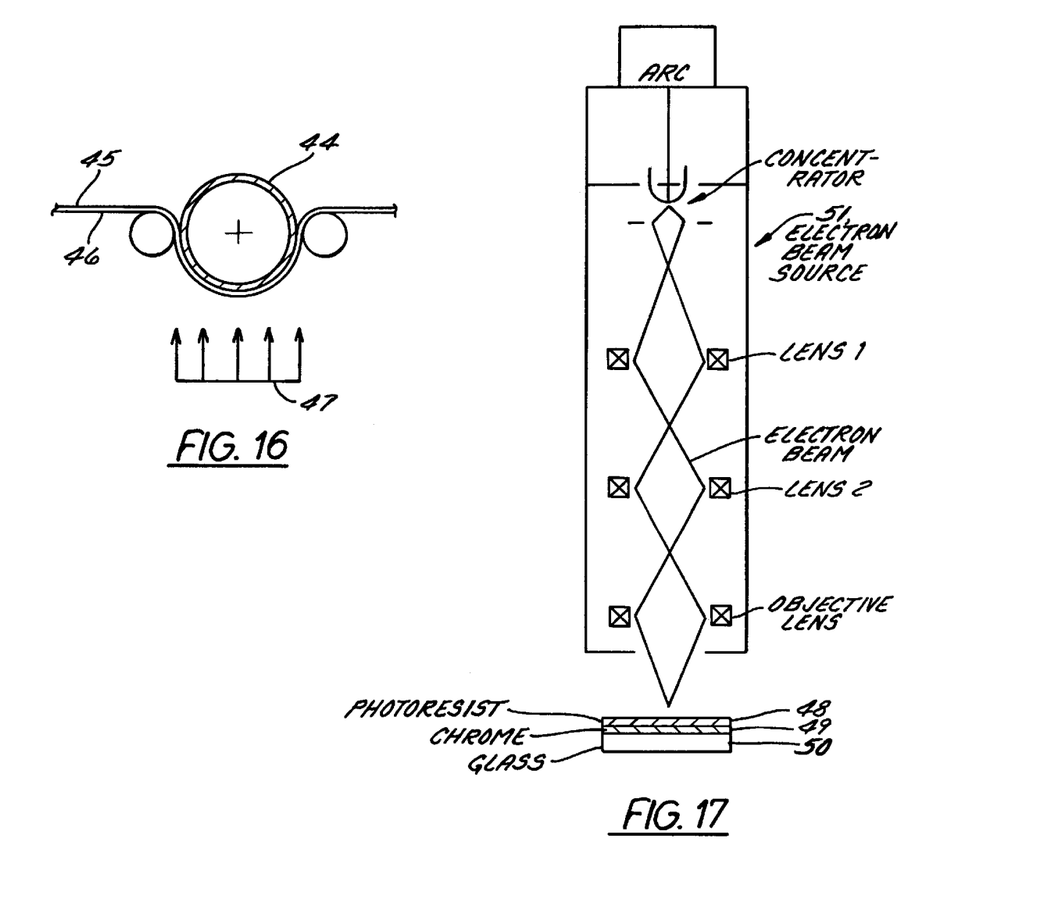
FIG. 16 is a drawing of a continuous or discrete drum press.
FIG. 17 is a drawing of an electron beam or excimer laser recording set-up.

In a third, film-less embodiment, a modified imagesetter is used to record the dot pattern representing speckle described above directly onto the surface of a metal drum covered with a layer of photoresist, instead of recording features on a film that has been secured to the surface of a drum. As seen in FIG. 15, the photoresist covered drum 41 is exposed by lasers 42 scanning the entire drum in an imagesetter 43. The drum 41 is then removed from the imagesetter 43 and is processed by standard etching techniques. Using standard materials and processes, photoresist developer is first used to etch the unexposed photoresist down to the surface of the drum. The unexposed surfaces are then further etched with nitric acid to etch the pattern into the metal. The photoresist is then removed using a solvent. As seen in FIG. 16, the resulting drum 44 is a master that can be used for embossing a seamless light shaping diffuser of unlimited length. The diffuser can be embossed into an epoxy 45 or other plastic resin which is affixed to a plastic substrate 46. The drum 44 is rolled over the substrate 45 coated with epoxy 45 to obtain an imprint of the diffuser and expose to UV light source 47 to cure the epoxy. Light source 47 is an uncollimated UV light source in the wavelength range of 365 to 400 nm with an output power of 300 to 500 watts.

E. Excimer Laser or Electron Beam Recording

It is also possible to achieve small feature sizes without photoreduction by employing a UV excimer laser or an electron beam as the light source. In the case of a UV excimer laser, feature sizes as small as approximately 7 microns may be obtained. Alternatively, an electron beam may be used to obtain even smaller dot sizes approaching less than 1 micron. As seen in FIG. 17, this process involves taking a sheet of glass 50, depositing a first layer of chrome 49 on the glass then depositing a layer of photoresist 48 on top of the chrome 49. A UV excimer laser 51 and/or electron beam source can be used to record computer generated pseudorandom features into the photoresist. The pseudorandom features are generated in a maximum length shift register as described above which is used to modulate the source 51 as it exposes the photoresist 48. Then, using standard processing, the unexposed photoresist is etched away and a further etching is performed using nitric acid or the like to etch into the layer of chrome metal. The remaining photoresist is then washed away with a solvent. The resulting dot size is considerably smaller than with the film process outlined above; however, the excimer laser or electron beam units are rather expensive.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that, within the scope of the appended claims, the invention may be practiced otherwise than as specifically described herein.

What is claimed is:

1. A method of manufacturing a master optical surface diffuser, the method comprising the steps of:

providing a random irregular speckle pattern, wherein the speckle pattern is based on a pseudorandom sequence that is generated by a computer having a maximum length shift register that includes a shifting register and a feedback loop;

exposing a photographic film to laser light modulated by the speckle pattern;

developing the photographic film;

placing the photographic film in contact with a photosensitive medium; and exposing the photosensitive medium to incoherent light through the photographic film to record the speckle pattern as a random irregular surface structure in the photosensitive medium.

2. The method as defined in claim 1 wherein the photosensitive medium is a photoresist material.

3. The method as defined in claim 1 wherein the laser light is emitted by a krypton laser.

4. The method as defined in claim 1 wherein the incoherent light is emitted by a UV arc lamp.

5. A method of manufacturing a master optical surface diffuser, the method comprising:

generating a random pattern of features using a computer having a maximum length shift register that includes a shift register and a feedback loop;

recording the random pattern of features in a mask;

covering a photosensitive medium with the mask; and exposing the masked photosensitive medium to a source of incoherent light whereby the random pattern of features is transferred to the photosensitive medium as a random surface structure.

6. A method for making a master surface diffuser, the method comprising the steps of:

placing film on a print drum of an imagesetter;

exposing the film with a radiation beam source inside the imagesetter to form a pseudorandom amplitude mask having a pseudorandom sequence that is generated by a computer having a maximum length shift register that includes a shift register and a feedback loop;

removing the film from the print drum;

developing the film to produce a negative;

placing the negative adjacent to a photoresist;

exposing the photoresist through the film to an incoherent light source; and developing the photoresist to record a pseudorandom surface structure in the photoresist.

7. The method as defined in claim 6 further comprising the step of moving the incoherent light source while exposing the negative and photoresist thereto.

8. A method as defined in claim 6 further comprising the step of reducing the negative in a high resolution reducer.

9. The method as defined in claim 8 wherein the reduced negative is used as a stepper mask.

10. The method as defined in claim 6 wherein the incoherent light source is diffuse.

11. A method of making a master surface diffuser, the method comprising the steps of:

exposing a film to a coherent radiation beam source which has been passed through a spatial filter and a diffuser having random irregular features, wherein the random irregular features are generated by a computer having a maximum length shift register that includes a shift register and a feedback loop;

developing the film;

placing the developed film on a photoresist material;

exposing the photoresist material through the film using an incoherent light source; and developing the photoresist to record the random irregular features as a random irregular features as a random irregular surface structure in the photoresist material.

12. A method as defined in claim 11 further comprising the step of reducing the film using a high resolution reducer.

13. A method as defined in claim 11 wherein the radiation beam is emitted by an UV excimer laser.

14. A method of making a metal master surface diffuser, the method comprising the steps of:

coating glass with a layer of chrome;

coating the layer of chrome with a photosensitive medium;

creating a computer generated pseudorandom amplitude mask using a computer having maximum length shift register that includes a shift register and a feedback loop;

exposing the photosensitive medium with energy emitted by a radiation source passed through the computer generated mask;

etching the unexposed portions of the photosensitive medium;

etching the portions of the chrome layer exposed by the etched away photosensitive medium; and washing off the remaining photosensitive medium.

15. The method as defined in claim 14 further comprising the step of using the etched layer of chrome in one of an injection molding process and a stamping process.

16. The method as defined in claim 14 wherein the radiation source is one of an UV excimer laser and an electron beam source.

17. A method of manufacturing a master surface diffuser using an imagesetter, the method comprising:

generating a pseudorandom pattern of features;

recording the pseudorandom pattern of features in a mask with said imagesetter, wherein the pseudorandom pattern of features is generated by using a computer having a maximum length shift register that includes a shift register and a feedback loop;

covering a photosensitive medium with the mask;

exposing the photosensitive medium through the mask to a source of incoherent light whereby the random pattern of features is transferred to the photosensitive medium; and etching the photosensitive medium so as to realize the random pattern of features in the photosensitive medium.

18. The method as defined in claim 17 wherein the mask comprises photographic film.

19. The method as defined in claim 17 wherein the photosensitive medium comprises photoresist.

20. The method as defined in claim 17 wherein the incoherent light source comprises an arc light.

21. The method as defined in claim 17 wherein the incoherent light source comprises an UV light source.

22. The method as defined in claim 17 wherein the incoherent light source is diffuse.

23. The method as defined in claim 17 wherein the photosensitive medium comprises a drum coated with photoresist.

24. A method of manufacturing a master optical diffuser, the method comprising:

generating a pseudorandom speckle pattern based on a pseudorandom sequence that is generated by a computer having a maximum length shift register that includes a shift register and a feedback loop;

exposing a photographic film to laser light modulated by the speckle pattern;

developing the photographic film;

placing the developed film between a photoresist and a UV light source;

exposing the film to the UV light source, whereby the speckle pattern is transferred to the photoresist; and etching the photoresist so as to provide the random pattern of features in the photosensitive media.

* * * * *